Aug. 15, 1933.  A. BOLTON  1,922,350
AUTOMATIC FRICTION CLUTCH
Filed March 31, 1930
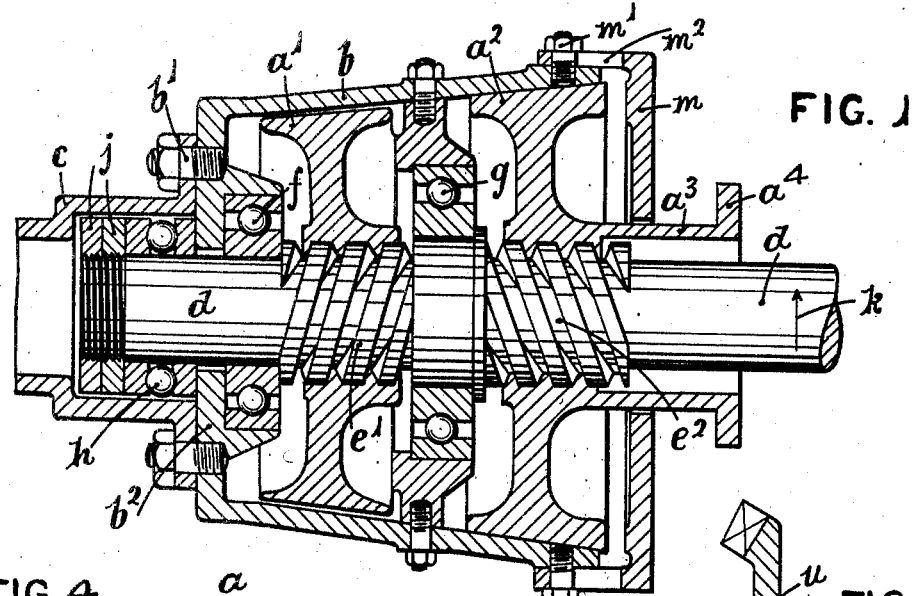
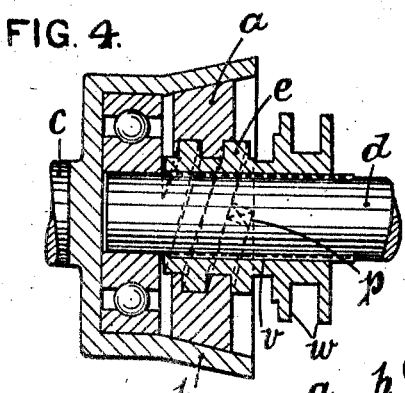
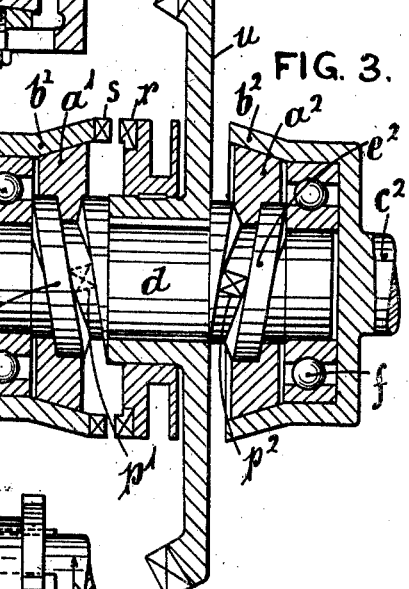
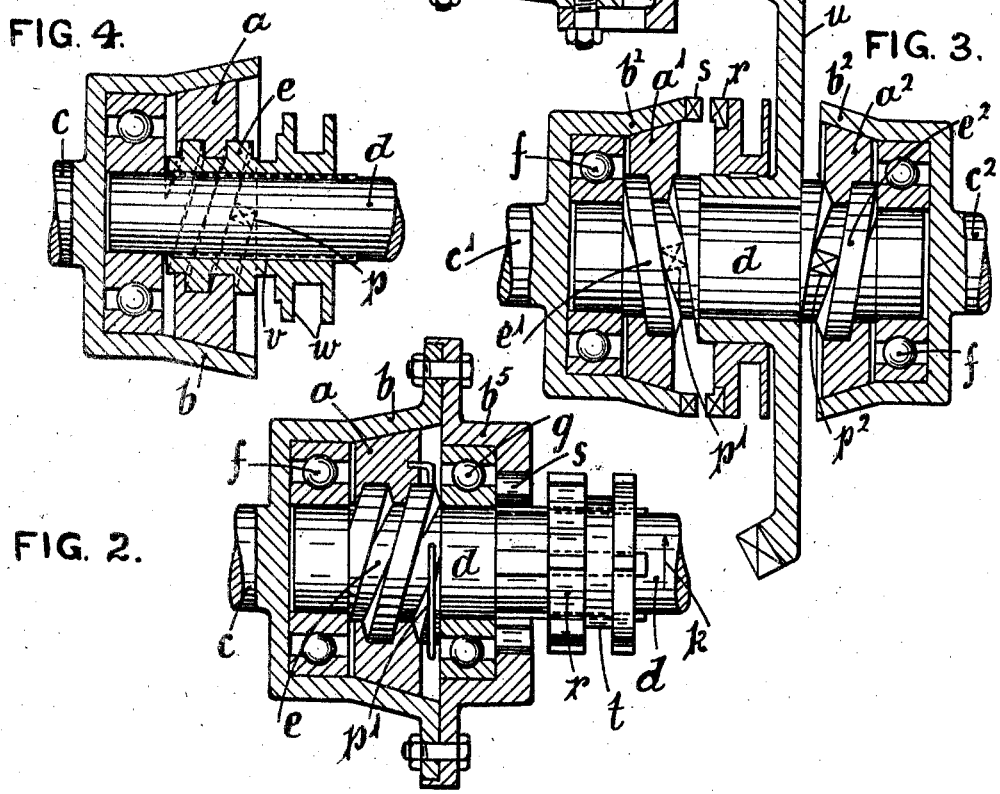
INVENTOR
ARTHUR BOLTON,
ATTORNEYS

Patented Aug. 15, 1933

1,922,350

UNITED STATES PATENT OFFICE

1,922,350

AUTOMATIC FRICTION CLUTCH

Arthur Bolton, Gateshead, England, assignor of one-half to John English, North Leam, England Application March 31, 1930, Serial No. 440,210, and in Great Britain April 8, 1929

5 Claims. (Cl. 192—48)

This invention relates to automatic free wheel friction clutches of the type wherein the pressure between the friction members of the clutch is caused by the torque of the drive the pressure, once the friction surfaces are engaged, being independent of any spring action.

It is the object of this invention to provide an improved and simple form of free wheel clutch of this type.

A free wheel clutch made in accordance with this invention is provided with friction members adapted to engage under pressure caused by and substantially proportional to the torque of the drive, the members being engaged and disengaged by the action of a floating nut or like member of which the turning motion is controlled by the relative speeds of the driving and of the driven shafts, the disengagement of the clutch being constant so long as the driven shaft tends to overrun the driving shaft.

I will more fully describe my invention with reference to the accompanying drawing wherein Figures 1, 2, 3 and 4 are sectional elevations illustrating four alternative clutches in accordance therewith.

Referring to the said drawing, in the example illustrated in Fig. 1, the clutch is provided with two cones $a^1$, $a^2$ disposed within a conical shell $b$ forming the female member of the clutch, said shell being fixed by studs $b^1$ to the hollow driven shaft $c$. The driving shaft $d$ is provided with opposite threads $e^1$, $e^2$ loosely engaging said cones, the hubs of which are internally threaded to correspond. Ball bearings $f$, $g$ are interposed between the shell $b$ and the driving shaft $d$, and a ball thrust bearing $h$ is disposed between nuts $j$ on the end of the shaft $d$ and the flange $b^2$ of the shell.

The drive of the shaft $d$ is transmitted through the threads $e^1$, $e^2$ to the cones $a^1$, $a^2$. In Fig. 1, when the shaft is revolving in the direction of the arrow $k$, the cone $a^1$ engages the shell $b$ and becomes wedged between it and the thread $e^1$ whereupon the rotation of the driving shaft $d$ is transmitted to the shell and hence to the driven shaft $c$, while the cone $a^2$ is retained by its thread $e^2$ out of engagement with the shell $b$, the cone $a^2$ revolving freely with the thread $e^2$. On the rotation of the shaft $d$ being reversed, the thread $e^1$ moves the cone $a^1$ to the right to disengage it from the shell $b$ and allow the cone to revolve freely with the thread, and the thread $e^2$ simultaneously moves the cone $a^2$ to the left to engage it with the shell, whereupon the cone becomes wedged between the shell and the thread $e^2$ and the reversed rotation of the driving shaft $d$ is transmitted to the shell and hence to the driven shaft $c$.

During transmission, when the revolutions of the driven shaft $c$ exceed those of the driving shaft $d$, the cone transmitting the drive is caused, by reason of its frictional coaction with the shell $b$, to overrun its thread and is thus automatically moved axially and so disengaged from the shell $b$. Small coil springs (not shown in Fig. 1 but illustrated at $p^1$ in Fig. 2) are interposed between the shaft $d$ at the thread $e^1$ and the cone $a^1$, and between the shaft $d$ at the thread $e^2$ and the cone $a^2$, which constantly tend to twist the cones and drive them up the threads into engagement with the shell $b$. During freewheeling these springs are compressed by the movement of the cones.

Immediately the revolutions of the driving shaft $d$ exceed those of the driven shaft $c$, the said springs cause rotation of the appropriate cone until it engages the shell $b$ when it is tightened under the action of the torque.

The device thus forms a free wheel operating automatically when the driven shaft overruns the driving shaft irrespective of the direction in which the driving shaft is rotating.

For the purpose of locking the clutch when free-wheeling, a flanged washer $m$ is loosely secured by studs $m^1$ to the end of the shall $b$ remote from the driven shaft $c$, said studs engaging slots $m^2$ in said flanged washer so that the latter can be slidden axially on the shell, within the limits of said slots. The cone $a^2$ is provided with an axial extension $a^3$ terminating in a flange $a^4$. A control lever or fork (not shown) is adapted to be applied to the channel between the flange $a^4$ and the washer $m$ to press the washer against the adjacent end of the cone $a^2$ which is rotating freely with the driving shaft $d$. The rotation of the washer and hence of the shell is thus applied to the cone to cause it to overrun its thread $e^2$ and engage the shell and lock it to the driving shaft. The cone can thus be used as a brake on the shell $b$ whereby its speed can be quickly reduced to that of the driving shaft, or whereby the shell can be brought to rest where the driving shaft is stationary, the resistance of the engine or gear associated with the driving shaft $d$ being in this way applied to the shell and driven shaft.

According to the modification illustrated in Fig. 4, the cones $a^1$, $a^2$ of Fig. 1 are combined to form a single cone $a$, and a single thread $e$ is provided on a sleeve $v$ which is splined or keyed into the driving shaft $d$ and fitted with flanges $w$ at its outer end adapted to be engaged by a control lever (not shown) whereby the sleeve and hence the threads can be slidden axially on the driving shaft. A stop $p$ is provided on the thread $e$. To lock the clutch, the sleeve is moved to the left towards the driven shaft $c$ and carries the cone $a$ with it until the cone engages the shell $b$, the sleeve and the stop $p$ preventing return movement of the cone. When the clutch is required to automatically engage and disengage according to the relative speeds of the driving and driven shafts, the sleeve v is moved away from the driven shaft c, and the cone is then free to move along its thread and disengage the shell b when the driven shaft overruns the driving shaft, the cone engaging the shell immediately the driving shaft gains on the driven shaft, the engagement being started under the action of a coil spring such as is herein described with reference to Fig. 1.

In the alternative arrangement illustrated in Fig. 2, a single cone $a$ is employed having its friction surface tapering towards the driven shaft $c$, the shell $b$ being correspondingly formed and being in one with the shaft $c$ and fitted with a flanged extension $b^5$ housing the ball bearing $g$ between it and the driving shaft $d$ which is provided with a thread $e$. The cone $a$ is internally threaded to correspond and is a loose fit on the thread $e$. Rotation of the shaft $d$ in the direction indicated by the arrow $k$ travels the cone $a$ to the left and causes it to engage the shell $b$ and transmit the rotation thereto and hence to the driven shaft $c$. When the revolutions of the shaft $c$ exceed those of the shaft $d$, the cone overruns the thread and moves to the right to disengage it from the shell. The shell $b$ may be partially filled with lubricant, and a spring $p^1$ as hereinbefore described may be fitted between the cone and the bearing $g$ to cause a constant slight friction between the shell and the cone to ensure the immediate engagement of the cone with the shell when the driving shaft gains on the driven shaft when free-wheeling.

A radially-projecting stop may be fitted in this construction also on the driving shaft $d$ to limit the movement to the right of the cone $a$.

For the purpose of locking the clutch, a sliding dog or toothed wheel $r$ is keyed onto the driving shaft $d$, and the flange $b^5$ of the shell is provided with teeth or dogs $s$ to correspond. The dog $r$ has a groove $t$ to receive a control lever or fork (not shown) whereby it can be moved to the left to engage it with the teeth $s$ of the flange $b^5$ and so lock the driving shaft $d$ to the shell $b$ and hence to the driven shaft $c$.

The improved clutches are particularly applicable to the power transmission shafts of automobiles, and provide means whereby the engine of the vehicle can be used as a brake on hills, or when otherwise desirable, the engine being speeded up until the driving shaft approximates the speed of the driven shaft, and the locking lever or fork operated to lock my improved clutch.

Fig. 3 shows the application of two clutches according to my invention to the driving axle of a motor vehicle as a differential gear. A clutch is introduced on each side of the central crown wheel $u$ which is keyed on or may be part of the driving shaft $d$, said shaft running in ball bearings $f$, $f$ and being provided with opposite threads $e^1$, $e^2$ on each side of said crown wheel coacting with cones $a^1$, $a^2$ respectively. The shells $b^1$, $b^2$ are in one with the portions $c^1$, $c^2$ of the rear axle, the left-hand shell $b^1$ being provided with teeth $s$ on its face with which coact corresponding teeth on a sliding dog $r$ keyed on the boss of the crown wheel $u$ whereby the shell $b^1$ can be positively locked to the wheel $u$. Normally, the axles $c^1$, $c^2$ are driven from the crown wheel $u$ through the threads $e^1$, $e^2$, cones $a^1$, $a^2$ and shells $b^1$, $b^2$ and each driven axle is free to overrun the wheel $u$, stops $p^1$, $p^2$ preventing the cones moving too far out of engagement with the shells $b^1$, $b^2$. By sliding the dog $r$ by a suitable control lever or fork the wheel $u$ can be locked to the shell $b^1$ and a positive drive obtained.

The clutches of my invention comprise few parts, and are frictionless when transmitting movement as they revolve as a whole. The control lever or fork is only in action when locking or unlocking the clutch.

What I claim and desire to secure by Letters Patent is:—

1. An automatic free-wheel clutch comprising a driving shaft and a driven shaft disposed in axial alignment, a conical shell on said driven shaft, oppositely threaded sections on said driving shaft, conical nuts on said threaded sections adapted to engage the shell on rotation of the driving shaft, and non-automatic means for bringing about relative movement at will between one nut and its threaded section to force the nut into engagement with the shell and obtain a solid drive.

2. An automatic free-wheel clutch comprising a driving shaft and a driven shaft disposed in axial alignment, a conical shell on said driven shaft, oppositely threaded sections on said driving shaft, conical nuts on said threaded sections adapted to engage the shell on rotation of the driving shaft, and non-automatic means for bringing about relative movement at will between one nut and its threaded section to force the nut into engagement with the shell and obtain a solid drive, said means coacting with the nut to accelerate its movement in relation to the thread.

3. An automatic free-wheel clutch comprising a driving shaft and a driven shaft disposed in axial alignment, a conically-recessed shell on said driven shaft, a thread on said driving shaft, a conical nut on said thread, and non-automatic means for bringing about relative movement at will between said nut and said thread to force the nut into engagement with the shell and obtain a solid drive, said means comprising a member on the larger end of the shell, a slotted connection between said member and said shell permitting said member to slide axially in relation to the shell within the limits of said slots, and means for sliding said member into contact with the larger end of the nut to impart thereto the rotation of the shell and so accelerate the movement of the nut on the thread.

4. In a free wheeling clutch, a shaft having a conical shell thereon, a second shaft having oppositely threaded sections thereon, a cone disc on each threaded section operated by the rotation of the shaft to engage the shell or be free from the shell, and additional means to cause one of the discs to engage the shell.

5. In a free wheeling clutch, a shaft having a conical shell thereon, a second shaft having oppositely threaded sections thereon, a cone disc on each threaded section adapted by rotation of the second shaft to engage the shell, a bearing for the second shaft in the shell between the cone discs, and other means to cause one of the discs to engage the shell.

ARTHUR BOLTON.